US011664858B2

United States Patent
Frenger et al.

(10) Patent No.: US 11,664,858 B2
(45) Date of Patent: May 30, 2023

(54) ANTENNA SYSTEM FOR USE IN DISTRIBUTED MASSIVE MIMO NETWORKS

(71) Applicant: Telefonaktiebolaget LM Ericsson (publ), Stockholm (SE)

(72) Inventors: Pål Frenger, Linköping (SE); Jan Hederen, Linghem (SE); Per Elmdahl, Linköping (SE); Linnea Faxen, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/416,375

(22) PCT Filed: Oct. 15, 2019

(86) PCT No.: PCT/SE2019/051015
§ 371 (c)(1),
(2) Date: Jun. 18, 2021

(87) PCT Pub. No.: WO2020/130902
PCT Pub. Date: Jun. 25, 2020

(65) Prior Publication Data
US 2022/0060224 A1    Feb. 24, 2022

Related U.S. Application Data

(60) Provisional application No. 62/782,364, filed on Dec. 20, 2018.

(51) Int. Cl.
*H04L 1/02*    (2006.01)
*H04B 7/0452*    (2017.01)
*H04B 7/022*    (2017.01)

(52) U.S. Cl.
CPC ........... *H04B 7/0452* (2013.01); *H04B 7/022* (2013.01)

(58) Field of Classification Search
CPC .. H04B 7/0413; H04B 7/0615; H04B 7/0452; H04B 7/0617; H04L 5/0048; H04L 5/0051; H04W 16/28; H04W 88/08; H01Q 1/007
(Continued)

(56) References Cited

U.S. PATENT DOCUMENTS 9,935,698 B1    4/2018    Yang et al.
2006/0069813 A1    3/2006    Biamonte et al.
(Continued)

FOREIGN PATENT DOCUMENTS

WO    2015183791 A1    12/2015
WO    2015185680 A1    12/2015
(Continued)

OTHER PUBLICATIONS

Author Unknown, "pWave—Artemis pCell Wireless Technology", Artemis pCell Products, https//www.artemis.com/products, accessed May 20, 2021, 1-9.
(Continued)

*Primary Examiner* — Khai Tran
(74) *Attorney, Agent, or Firm* — Christopher & Weisberg. P.A.

(57) ABSTRACT

An antenna system (150) comprises a Centralized Processing Unit (160); at least two antenna units (200) connected to the CPU (160) by cables. Each antenna unit (200) comprises at least one connector; one or more antenna elements (220) and one or more 5 Antenna Processing Units (230) connected to the one or more antenna elements (200). The one or more antenna processing units (230) are connected to a data bus connected to the at least one connector.

17 Claims, 14 Drawing Sheets

(58) Field of Classification Search
USPC ......... 375/267, 260, 262; 343/700, 702, 833
See application file for complete search history.

(56) References Cited

U.S. PATENT DOCUMENTS

| | | | |
|---|---|---|---|
| 2013/0237294 A1* | 9/2013 | Periyalwar | H04B 7/0825 |
| | | | 455/575.7 |
| 2013/0288615 A1* | 10/2013 | Anand | H01Q 3/04 |
| | | | 455/77 |
| 2014/0233442 A1 | 8/2014 | Atias et al. | |
| 2014/0235287 A1 | 8/2014 | Maltsev et al. | |
| 2016/0204517 A1* | 7/2016 | Hu | H01Q 1/523 |
| | | | 343/824 |
| 2021/0184371 A1* | 6/2021 | Ying | H01Q 9/0407 |

FOREIGN PATENT DOCUMENTS

| | | |
|---|---|---|
| WO | 2018103897 A1 | 6/2018 |
| WO | 2018148630 A1 | 8/2018 |

OTHER PUBLICATIONS

Interdonato, Giovanni, "Signal Processing Aspects of Cell-Free Massive MIMO", Linköping Studies in Science and Technology Licentiate Thesis No. 1817, 2018, 1-49.
Interdonato, Giovanni, et al., "Ubiquitous Cell-Free Massive MIMO Communications", https://arxiv.org/abs/1804.03421, accessed Jan. 15, 2021, 2018, 1-19.

* cited by examiner

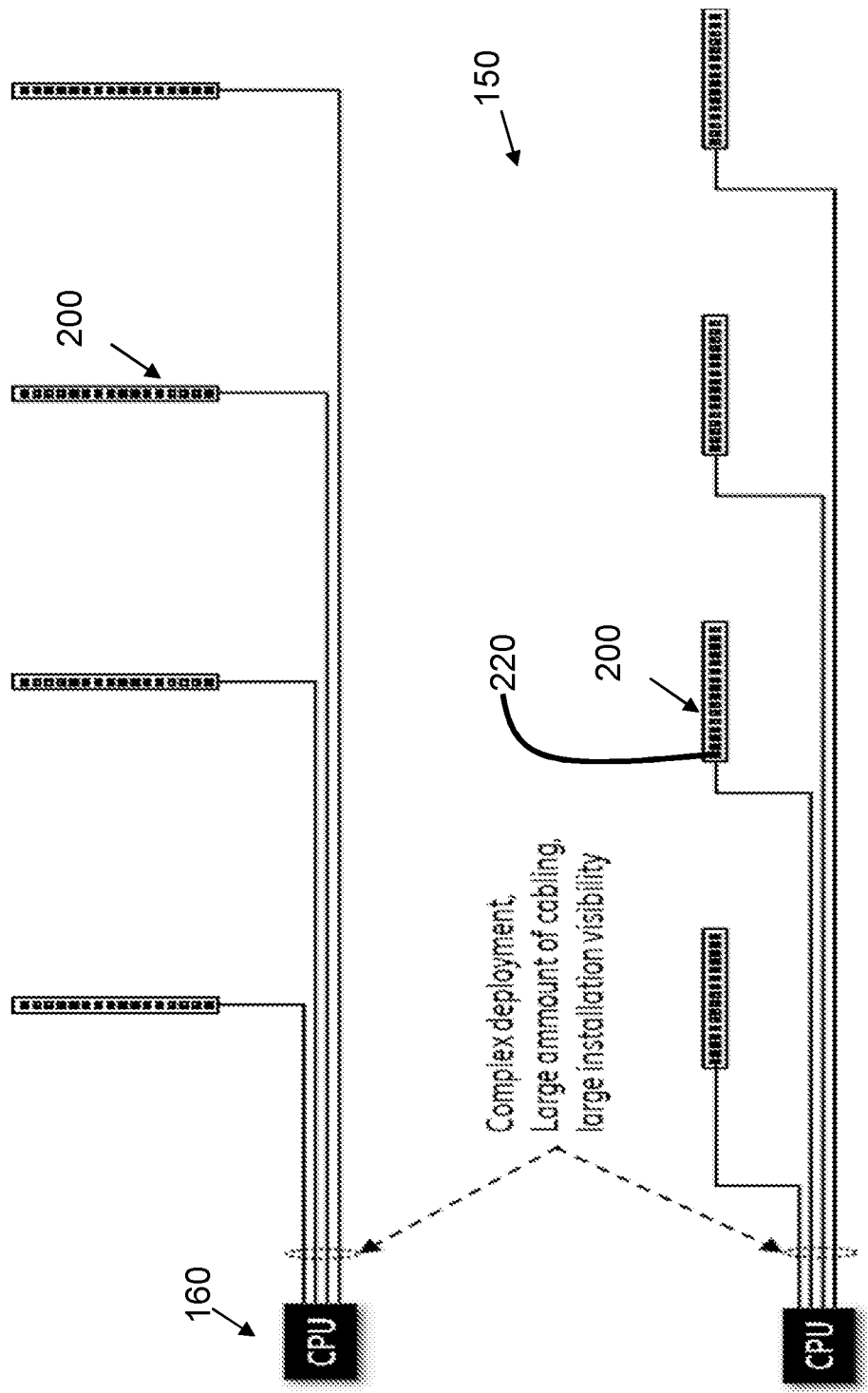

ANTENNA SYSTEM FOR USE IN DISTRIBUTED MASSIVE MIMO NETWORKS

TECHNICAL FIELD

Embodiments herein relate to antenna systems. In particular, they relate to antenna systems with multiple antenna units and base stations comprising the antenna systems to implement Multiple-Input Multiple-Output (MIMO) in a wireless communication network.

BACKGROUND

In a typical wireless communication network, wireless devices, also known as wireless communication devices, mobile stations, stations (STA) and/or User Equipments (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio access node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as New generation (NG) and 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Massive MIMO is also known as large-scale antenna systems and very large MIMO. Massive MIMO is a multi-user MIMO technology where each base station (BS) is equipped with a large number of antenna elements, typically more than 50, which are being used to serve many terminals that share the same time and frequency band and are separated in the spatial domain. A key assumption is that there are many more BS antennas than terminals, at least twice as many, but ideally as many as possible. Massive MIMO offers many benefits over conventional multi-user MIMO. First, conventional multi-user MIMO is not a scalable technology, since it has been designed to support systems with roughly equal numbers of service antennas and terminals, and practical implementations typically relies on frequency-division duplex (FDD) operation. By contrast, in massive MIMO, the large excess of service antennas over active terminals TDD operation brings large improvements in throughput and radiated energy efficiency. These benefits result from the strong spatial multiplexing achieved by appropriately shaping the signals sent out and received by the base station antennas. By applying precoding to all antennas, the base station can ensure constructive interference among signals at the locations of the intended terminals, and destructive almost everywhere else. Furthermore, as the number of antennas increases, the energy can be focused with extreme precision into small regions in space. Other benefits of massive MIMO include use of simple low-power components since it relies on simple signal processing techniques, reduced latency, and robustness against intentional jamming.

When operating in TDD mode, massive MIMO may exploit the channel reciprocity property, according to which the channel responses are the same in both uplink and downlink. Channel reciprocity allows the BSs to acquire channel state information (CSI) from pilot sequences transmitted by the terminals in the uplink, and this CSI is then useful for both the uplink and the downlink. By the law of large numbers, the effective scalar channel gain seen by each terminal is close to a deterministic constant. This is called channel hardening. Thanks to the channel hardening, the user devices can reliably decode the downlink data using only long-term statistical CSI, making most of the physical layer control signaling redundant, i.e. low-cost CSI acquisition. This renders the conventional resource allocation concepts unnecessary, and results in a simplification of the MAC layer. These benefits explain why massive MIMO has a central position in preliminary 5G discussions.

However, massive MIMO system performances are affected by some limiting factors: Channel reciprocity requires hardware calibration. In addition, the so-called pilot contamination effect is a basic phenomenon which profoundly limits the performance of massive MIMO systems. Theoretically, every terminal in a massive MIMO system could be assigned an orthogonal uplink pilot sequence. However, the maximum number of orthogonal pilot sequences that can exist is upper-bounded by the size of the coherence interval, which is the product of the coherence time and coherence bandwidth. Hence, adopting orthogonal pilots leads to inefficient resource allocation as the number of the user devices increases or it is not physically possible to perform when the coherence interval is too short. As a consequence, pilots must be reused across cells, or even within the home cell for higher cell density. This inevitably causes interference among user devices which share the same pilot. Pilot contamination does not vanish as the number of BS antennas grows large, and so it is the one impairment that remains asymptotically.

To implement massive MIMO in wireless communications networks, two different architectures may be adopted:

Centralized massive MIMO (C-maMIMO), where all the antennas are co-located in a compact area at both the BS and user device sides, as shown in FIG. 1. It represents the conventional massive MIMO system. FIG. 1 depicts a Centralized massive MIMO architecture.

Distributed massive MIMO (D-maMIMO), where BS antennas, herein named as Access Points (APs), are geographically spread out over a large area, in a well-planned or random fashion, as shown in FIG. 2. Antennas are connected together and to a Central Processing Unit (CPU) through high-capacity backhaul links, such as e.g. fiber-optic cables. It is also known as cell-free massive MIMO system. FIG. 2 depicts a Distributed massive MIMO architecture.

D-maMIMO architecture is an important enabler of network MIMO in future standards. Network MIMO is a terminology that is used for a cell-free wireless network, where all the BSs that are deployed over the coverage area act as a single BS with distributed antennas. This may be considered the ideal network infrastructure from a performance perspective, since the network has great abilities to spatially multiplex users and exactly control the interference that is caused to everyone.

The distinction between D-maMIMO and conventional distributed MIMO is the number of antennas involved in coherently serving a given user device. In D-maMIMO, every antenna serves every user device. Compared to C-maMIMO, D-maMIMO has the potential to improve both the network coverage and the energy efficiency, due to increased macro-diversity gain. This comes at the price of higher front haul requirements and the need for distributed signal processing. In D-maMIMO, the information regarding payload data, and power control coefficients, is exchanged via the backhaul network between the APs and the CPU. There is no exchange of instantaneous CSI among the APs or the central unit, that is CSI acquisition can be performed locally at each AP.

Due to network topology, D-maMIMO suffers from different degrees of path losses caused by different access distances to different distributed antennas, and very different shadowing phenomena that are not necessarily better. E.g. antennas deployed at the street level are more easily blocked by buildings than antennas deployed at elevated locations. Moreover, since the location of antennas in D-maMIMO has a significant effect on the system performance, optimization of the antenna locations is crucial. In addition, D-maMIMO potentially system suffers a low degree of channel hardening. As mentioned earlier, the channel hardening property is key in massive MIMO to suppress small-scale fading and derives from the large number of antennas involved in a coherent transmission. In D-maMIMO, APs are distributed over a wide area, and many APs are very far from a given user device. Therefore, each user device is effectively served by a smaller number of APs. As a result, channel hardening may be less pronounced. This would considerably affect the system performance.

The performance of any wireless communications network is clearly the availability of good enough CSI to facilitate phase-coherent processing at multiple antennas. Intuitively, acquiring high quality CSI should be easier with a C-maMIMO than in a D-maMIMO where the antennas are distributed over a large geographical area. Nevertheless, the macro-diversity gain has a dominant importance and leads to improved coverage and energy efficiency.

A problem with a massive MIMO deployment is that a large number of antennas generate a large amount of data. This implies that with traditional radio to antenna interfaces very large capacity fiber network are needed to shuffle this data around. Fiber is both expensive and needs skilled personal for installation. Both of which limit the deployment scenarios for massive MIMO. There is also a scalability issue as different size base-band units are needed to handle different array sizes, e.g. one to handle 32 antennas one other for 128 antennas etc.

From a practical point of view, the C-maMIMO solution where all antenna elements, e.g., APs, are placed close together has a number of drawbacks compared to D-maMIMO solution where the antenna elements are distributed over a larger area. These are e.g.:

Very large service variations: UEs that happen to be located close to the central massive MIMO node will experience very good service quality while for UEs further away the service quality will degrade rapidly.

Sensitive to blocking: On high frequency bands in particular, the signal is easily blocked by obstacles that obscures the line-of-sight between the UE and the C-maMIMO node. In D-maMIMO a number of antenna elements may be blocked but it requires much larger obstacles to block all antenna elements.

High heat concentration: Due to heat concentration it is difficult to make C-maMIMO nodes very small. In D-ma MIMO each antenna element, and its associated processing, generates only a small amount of heat and this simplifies miniaturization.

Large and visible installations: C-maMIMO installations may become large, especially on lower frequency bands. D-maMIMO installations are actually even larger, but the visual impact may be made almost negligible.

Installation requires personnel with "radio skills": Installing a complex piece of hardware in a single location requires planning and most probably also proper installation by certified personnel. In a D-maMIMO installation it is less crucial that each and every one of the very many antenna elements is installed in a very good location. It is sufficient that the majority of the elements are installed in good enough locations. The requirements on installation may be significantly relaxed with a D-maMIMO deployment.

Power limited by regulations, e.g. specific absorption rate SAR: If the antenna elements are located close together there will be an area close to the installation where electromagnetic wave safety rules applies. This is likely to put limits on the total radiated radio frequency power in many installations. In a D-maMIMO installation a user device may come close to a small number of antenna elements, but it is impossible to be physically close to many elements that are distributed over a large area.

There are many significant benefits with D-maMIMO compared to C-maMIMO. But the cabling and internal communication between antenna elements in a D-maMIMO is prohibiting in state-of-the art solutions. It is not economically feasible to connect a separate cable between each antenna element and a central processing unit (e.g. in a star topology) in a D-maMIMO installation. Either arbitrary or optimal APs topology may lead to a prohibitive cost for the backhaul component, as well as installation cost for distributing processing and settings.

SUMMARY

Embodiments herein provide an antenna system. The antenna system comprises a Centralized Processing Unit, CPU; at least two antenna units or sticks connected to the CPU by cables. Each antenna unit comprises at least one connector; one or more antenna elements; one or more Antenna Processing Units (APUs) connected to the one or more antenna elements. The one or more antenna processing units are connected to a data bus connected to the at least one connector.

According some embodiments herein, each antenna unit in the antenna system may comprise an input connector and a pass-through connector. The at least two antenna units are connected in serial to the CPU by serial cabling such that the input connector of the first antenna unit is connected to the CPU with a first cable, the pass-through connector of the first antenna unit is connected to the input connector of the second antenna unit with a second cable.

According some embodiments herein, each antenna unit in the antenna system may comprise one input connector. The at least two antenna units are connected in serial to the CPU by serial cabling such that the input connector of the first antenna unit is connected to the CPU with a first cable, the input connector of the second antenna unit is connected to the input connector of the first antenna unit with a second cable.

According some embodiments herein, the at least two antenna units may be configured to cooperate in phase coherency for beamforming of user data to and from a user device.

According some embodiments herein, the APUs may be configured to handle input and output communications with the CPU and perform some physical layer processing.

According some embodiments herein, each antenna unit may be provided with an identical base-band signal and each APU of the antenna unit may be configured to perform and apply pre-coding-based beamforming to its antenna elements independently.

According some embodiments herein, the CPU may be configured to compute pre-coder coefficients and the APU may be configured to apply the pre-coder coefficients to the antenna elements for beamforming.

According some embodiments herein, the APUs may be configured to compute and apply the pre-coding coefficients to the antenna elements for beamforming.

According some embodiments herein, the APUs may be configured to perform orthogonal frequency-division multiplexing (OFDM) encoding.

The antenna system described above may be implemented in a base station.

A semi-distributed massive Multiple-Input Multiple-Output (MIMO) communication system comprises a plurality of base stations, wherein each base station preferably comprises an antenna system as described above.

BRIEF DESCRIPTION OF THE DRAWINGS

Examples of embodiments herein are described in more detail with reference to attached drawings in which:

FIG. 8 illustrates an example of a semi-distributed massive MIMO utilizing parallel cabling to multiple antenna sticks of an antenna system according to embodiments herein;

DETAILED DESCRIPTION

As a part of developing embodiments herein the inventors identified a problem which first will be discussed.

Radio Stripes

Base stations in a radio stripe system may comprise of circuit mounted chips inside a protective casing of a cable or a stripe. Receive and transmit processing of each antenna element is performed next to the actual antenna element itself. Since the total number of distributed antenna elements is assumed to be large, e.g. several hundred, the radio frequency transmit power of each antenna element is very low.

Figure 1:
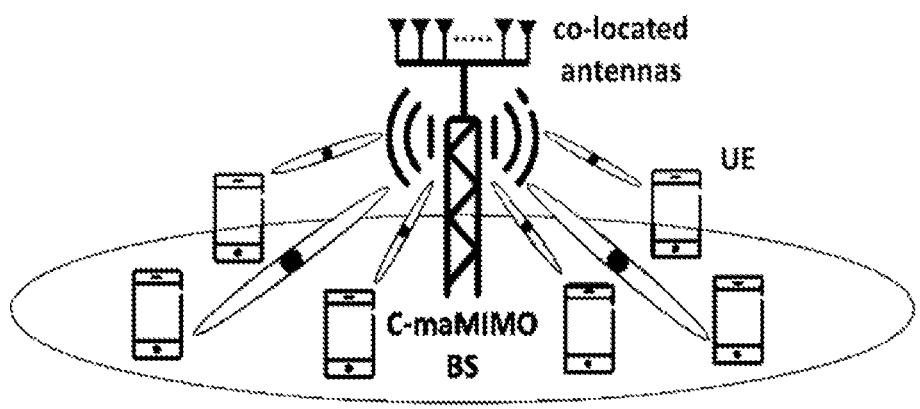
FIG. 1 illustrates a centralized massive MIMO architecture.
Figure 2:
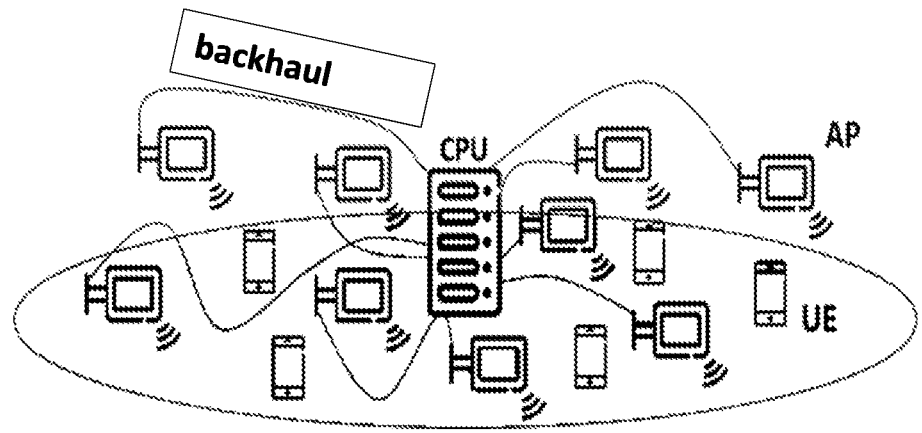
FIG. 2 illustrates a distributed massive MIMO architecture.
Figure 3:
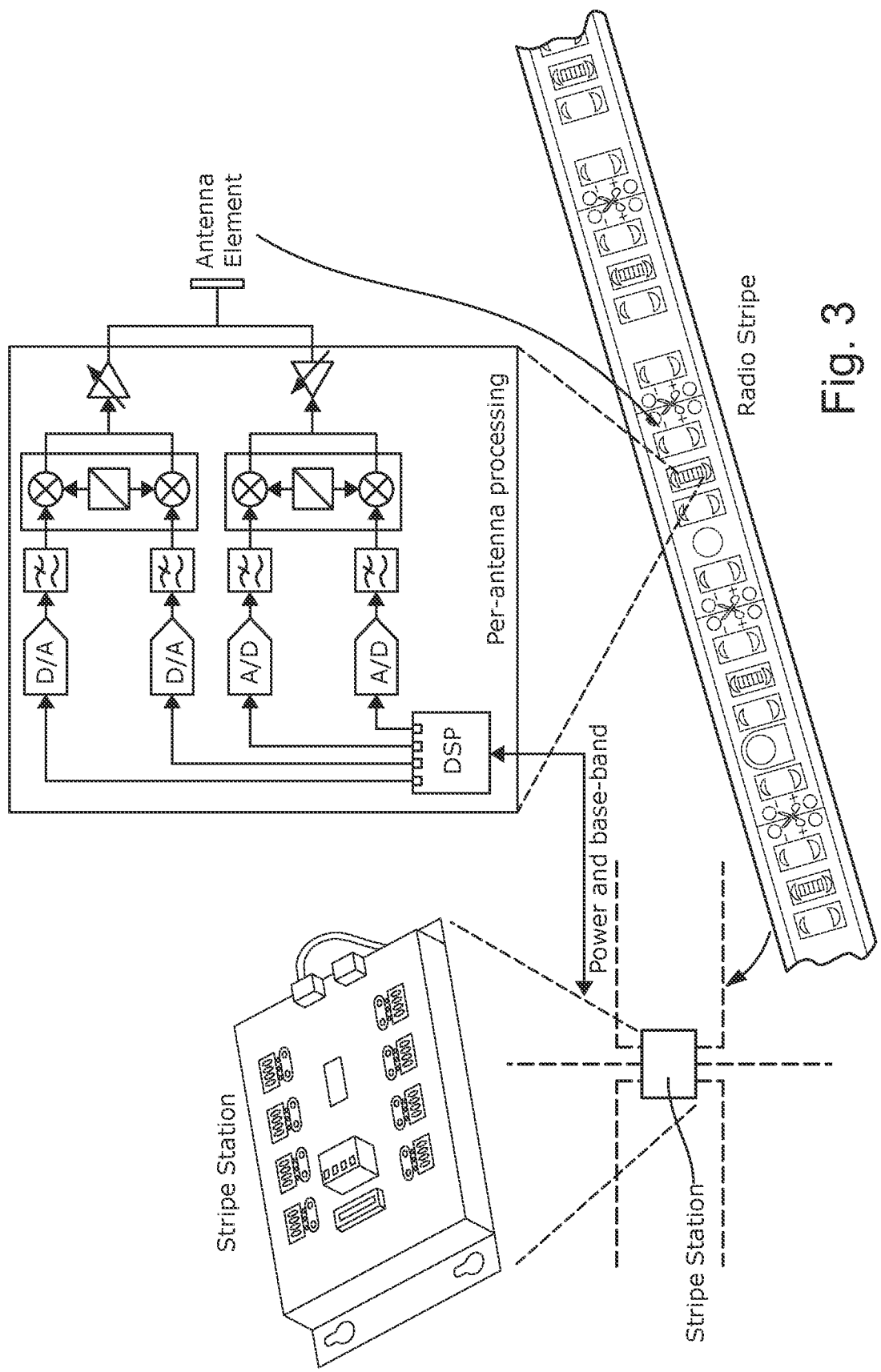
FIG. 3 illustrates an example embodiment of a massive MIMO radio stripe system.

FIG. 3 depicts an example of a massive MIMO radio stripe system. The example in FIG. 3 depicts a system mockup and shows a LED lightning stripe connected to a box. This figure is only used to exemplify how the actual distributed massive MIMO base station may be envisioned to be built. A central processing unit or stripe station connects with one or more radio stripes or distributed MIMO active antenna cables.

The actual radio stripes may comprise tape or adhesive glue on the backside, as in the example of the LED stripes. Or it may simply contain very small per-antenna processing units and antennas protected by the plastics covering the cable.

Figure 4:
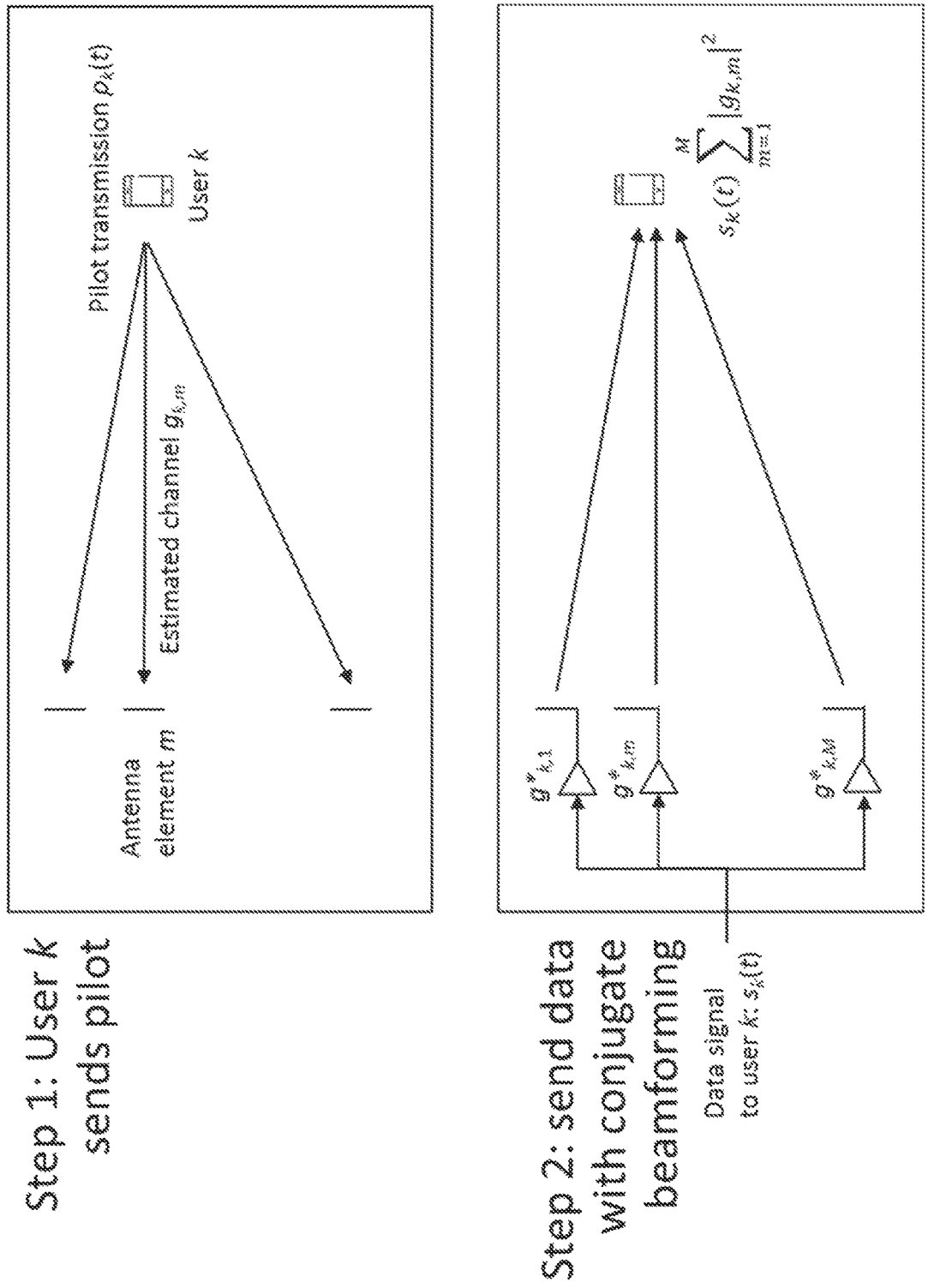
FIG. 4 illustrates an example beamforming processing.

An important observation that the inventors of embodiments herein have made is that both the transmitter and receiver processing can be distributed under certain assumption, e.g. see FIG. 4. FIG. 4 illustrates that by using e.g. conjugate beamforming the beamforming processing required may be performed per-element.

Figure 5:
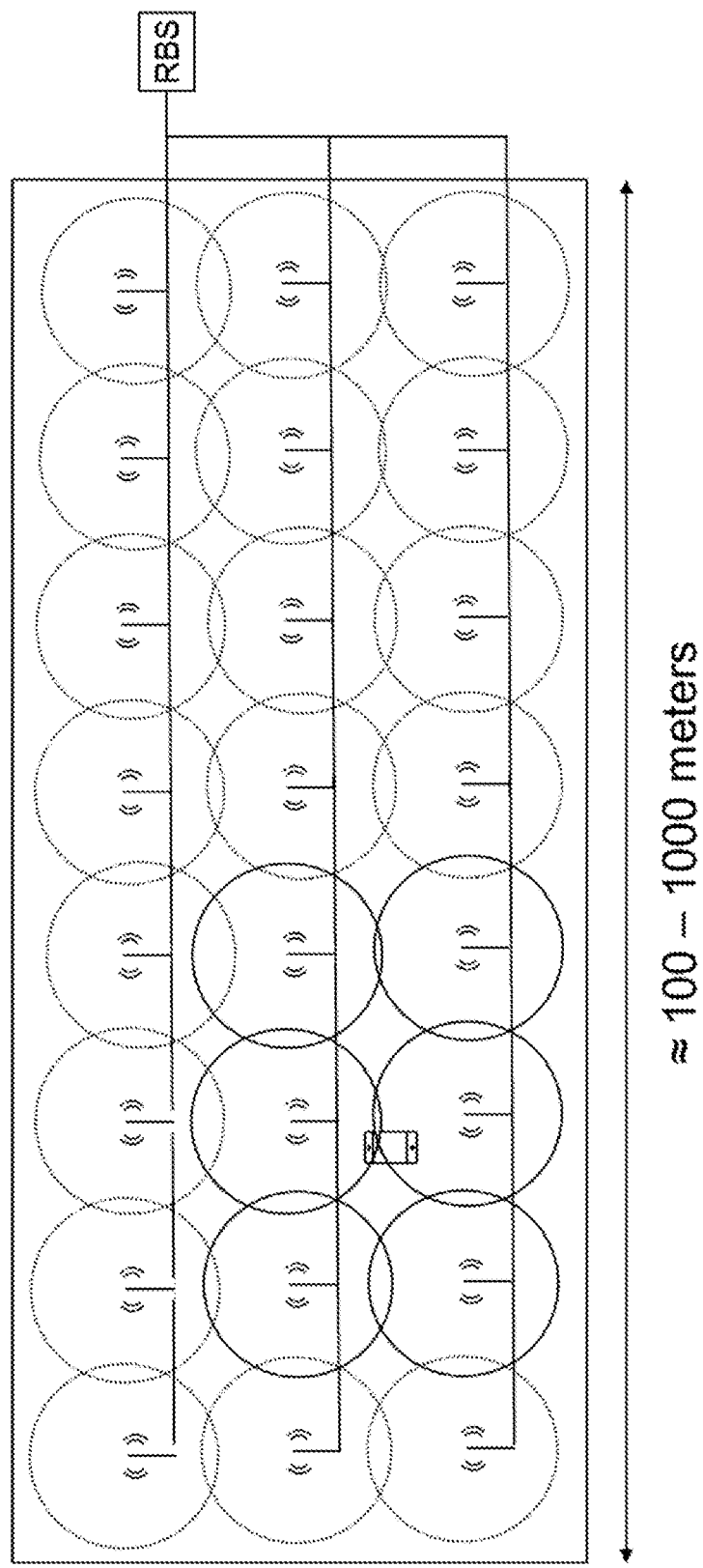
FIG. 5 illustrates a deployment example depicting how a distributed massive MIMO system may be used indoor in a building.

Radio stripe system deployments may e.g. be used to provide good coverage in factory buildings as schematically depicted in FIG. 5, depicting an deployment example of how a distributed massive MIMO system may be used indoor in a building e.g. factory. Antennas used to serve the user device in this example are marked by circles with solid lines.

Artemis "pCell"

A commercial solution that utilizes small distributed remote radio heads is developed by the company Artemis (see https://www.artemis.com/products). Artemis provide a small and low power remote radio head solution, denoted "pWave Mini", which they state "consist only of analog-to-digital (A/D), digital-to-analog (D/A), and RF up/down converters, power amplifier and antenna".

If it is tried to implement a distributed (massive) MIMO system using the Artemis "pWave" product, a separate power-over-Ethernet cable to each "pWave Mini node" would be needed. The pWave Mini is then feed with a Common Public Radio Interface (CIPRI) signal and all beamforming logic is performed in a centralized node. This is not a scalable solution since it results in a "spaghetti-monster" of cables if it is to scale this solution up to a massive MIMO scale.

Figure 6:
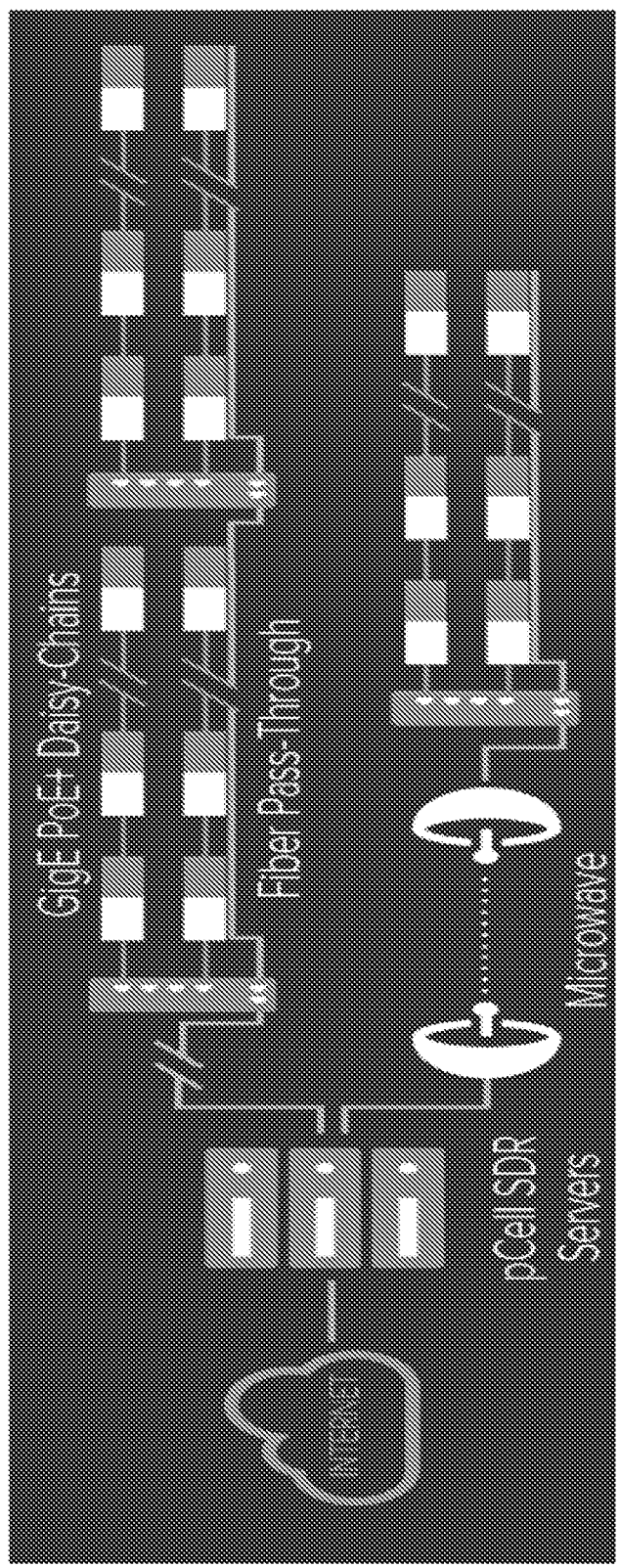
FIG. 6 illustrates a prior art solution utilizing daisy-chain.

Recently Artemis have presented a "daisy-chain" based extension to their solution that partly address this problem, see FIG. 6 depicting a prior art, screen-shot from https://www.artemis.com/products.

This solution enables one antenna port to be duplicated and distributed over a larger area. But each daisy-chain still only provides one antenna port and it is fed with one CIPRI signal that is forwarded to every element in the daisy-chain. The RF-signals transmitted over the air by different nodes are therefore identical in this solution.

To support multiple independent antenna ports that can be user device e.g. for pre-coder-based beamforming they still need parallel daisy chains. This unfortunately results in a spread of interference over an unnecessarily large area. The antenna ports they can use for pre-coder-based beamforming are distributed in space and not point-shaped.

Fully distributed massive MIMO may be impractical and expensive from an implementation point of view. To receive and transmit data from one antenna element several hardware components are needed e.g. a signal processor, clock circuit, input/output communication towards a central processing unit, etc. It may be too costly to add relatively advanced antenna processing units to only a single antenna element.

Prior art solutions consisting of very simple remote radio heads consisting only of analog-to-digital (A/D), digital-to-analog (D/A), and RF up/down converters, power amplifier and antenna, does not scale when implementing systems with a very large number of independent antenna ports, such as distributed massive MIMO.

US2014235287A1 describes a modular architecture of a centralized MIMO system. In order to modify US2014235287A1 into a distributed antenna system separate, parallel cables to each distributed unit is needed, see FIG. 3. This would result in a huge number of cables and such a solution scales poorly.

WO2015183791A1 describes a distributed antenna system without the capability to apply individual beamforming in each distributed antenna unit. It describes a way to extend the coverage area of one antenna unit by "daisy chaining". But this results in an identical signal being transmitted from multiple places. The drawbacks are that this spreads out the interference over a larger area and hence it also scales poorly.

Example embodiments herein relate to semi-distributed and serial massive MIMO. An object of embodiments herein is to improve the performance of a wireless communications network.

Embodiments herein provide a distributed antenna system using serial communication and solves both the problems associated with the prior art examples above. Embodiments herein only need one cable that sends identical signals to and from the distributed antenna units. However, since embodiments herein apply pre-coding individually in each distributed antenna unit, the signals transmitted over the air from each antenna unit are different.

Embodiments herein provide e.g. a semi-distributed massive MIMO system comprising two or more antenna units or sticks connected to a centralized processing unit. In some embodiments said antenna sticks are serially connected. The terms "antenna unit" and "antenna stick" are synonyms and may be used interchangeably hereafter.

According to embodiments herein antenna sticks are utilized, containing multiple antenna elements and a local antenna processing unit (APU) enables better scaling of hardware component cost compared to a fully distributed massive MIMO system. The local antenna processing unit enables pre-coding-based beamforming to be applied locally in the antenna stick. Thereby each antenna stick can be provided with the same identical base-band signal, enabling daisy-chain or serial communication when connecting multiple antenna sticks, while still supporting independent beamforming.

According to embodiments herein, a base station comprises at least two antenna sticks, each antenna stick comprising two or more internal antenna elements and one or more antenna processing unit(s), the base station is further characterized by:

the at least two antenna sticks cooperate in, phase coherent, beamforming of user data to and/or from a user device.

the at least two antenna sticks are serially connected with a cable connecting to a pass-through connector of a first antenna stick and an input connector of a second antenna stick, and the antenna sticks comprising two or more antenna processing units are connected with an antenna-stick-internal data bus.

Embodiments herein prove at least the following advantages:

A semi-distributed massive MIMO system provided by embodiments herein solves several practical implementation problems and cost issues associated with a fully distributed massive MIMO system. For example, expensive Hardware (HW) components such as the Antenna Processing Units (APUs) may serve multiple antenna elements in the same radio stick, and this in turn reduces the implementation cost of the system.

Furthermore, the antenna stick according to embodiments herein provides a stable platform for mounting components while still providing sufficient flexibility in the overall system. The sticks being solid reduces stress on component soldering while the connecting cables in between the antenna sticks still provide practically endless deployment flexibility.

In some embodiments the antenna sticks are serially connected and in these embodiments the deployment complexity, cost, and visibility are reduced significantly.

Figure 7:
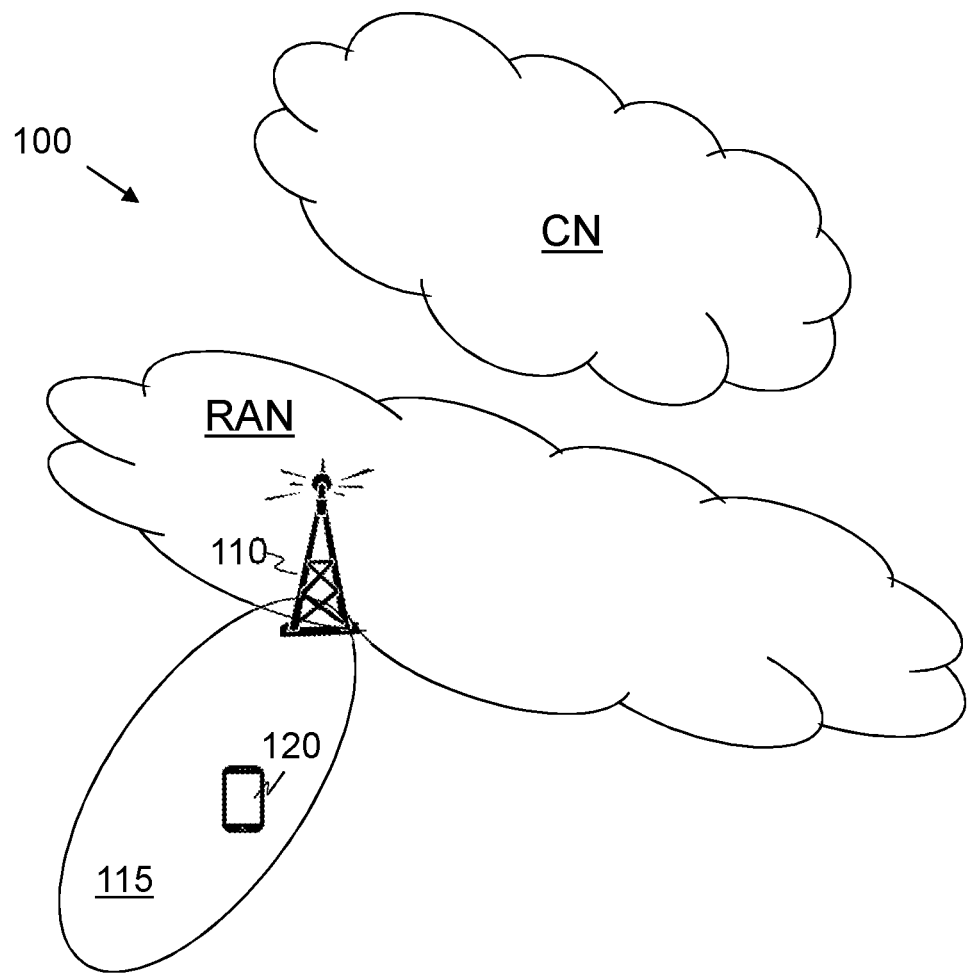
FIG. 7 illustrates a wireless communications network in which embodiments herein may be implemented.

Embodiments herein relate to wireless communication networks in general. FIG. 7 is a schematic overview depicting a wireless communications network 100 wherein embodiments herein may be implemented. The wireless communications network 100 comprises one or more RANs and one or more CNs. The wireless communications network 100 may use a number of different technologies, such as W-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Base stations operate in the wireless communications network 100 such as a base station 110. The base station 110 provides radio coverage over a geographical area, a service area referred to as a cell 115, which may also be referred to as a beam or a beam group of a first radio access technology (RAT), such as 5G, LTE, Wi-Fi or similar. The base station 110 may be a NR-RAN node, transmission and reception point e.g. a base station, a radio access node such as a Wireless Local Area Network (WLAN) access point or an Access Point Station (AP STA), an access controller, a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the base station 110 depending e.g. on the first radio access technology and terminology used. The base station 110 may be referred to as serving radio access nodes and communicates with a UE with Downlink (DL) transmissions to the UE and Uplink (UL) transmissions from the UE.

A semi-distributed massive Multiple-Input Multiple-Output (MIMO) communication system within the wireless communications network 100, comprises a plurality of base stations such as the base station 110, wherein each base station including the base station 110 comprises an antenna system according to embodiments herein.

A number of UEs operate in the wireless communication network 100, such as the UE 120. The UE 120 may be a mobile station, a non-access point (non-AP) STA, a STA, a user equipment and/or a wireless terminals, that communicate via one or more network nodes such as the base station 110, in a RAN to one or more core networks (CN), e.g. comprising CN node. It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Embodiments herein may be implemented in network nodes such as the base station 110.

Embodiments herein will now be further explained and exemplified and may be combined with embodiments as described above in any suitable way.

If the distributed HW components, e.g. a signal processor, clock circuit, input/output communication towards a central processing unit, etc., in a distributed massive MIMO system, such as the antenna system 150, may be utilized by many antenna elements in a semi-distributed architecture, the cost of the system will be reduced, see FIG. 8.

One implementation of a semi-distributed massive MIMO system such as the antenna system 150 would be to modify a centralized massive MIMO base station e.g. the base station 110, and place the antenna elements 220 in multiple "antenna sticks" 200 also referred to as "antenna units" 200 herein, connected by cables to a centralized processing unit denoted as CPU 160 in FIG. 8. The "antenna sticks" are placed in a non-co-located configuration. Each antenna stick comprises at least one antenna processing unit and at least two antenna elements.

Note that since the beam-forming is performed in distributed antenna processing units this system can have as many independent antenna ports as there are antenna elements in total. In prior art systems it would only be possible transmit 4 independent antenna ports in this configuration, i.e. In this example with 4 parallel cables connecting to the CPU.

FIG. 8 is a configuration of a semi-distributed massive MIMO utilizing parallel cabling to multiple antenna sticks antenna. Some drawbacks with this configuration is that it still requires many long parallel cables which increase the deployment complexity, visibility, and cost. Still, the number of parallel cables is reduced compared to prior art. In this example with 4 antenna sticks and 16 antenna elements per antenna stick, it needs 4 parallel cables, one per stick, to generate 4×16=64 independent antenna ports while prior art would require 64 parallel cables to do the same thing, i.e. one per independent antenna port.

Figure 9A:
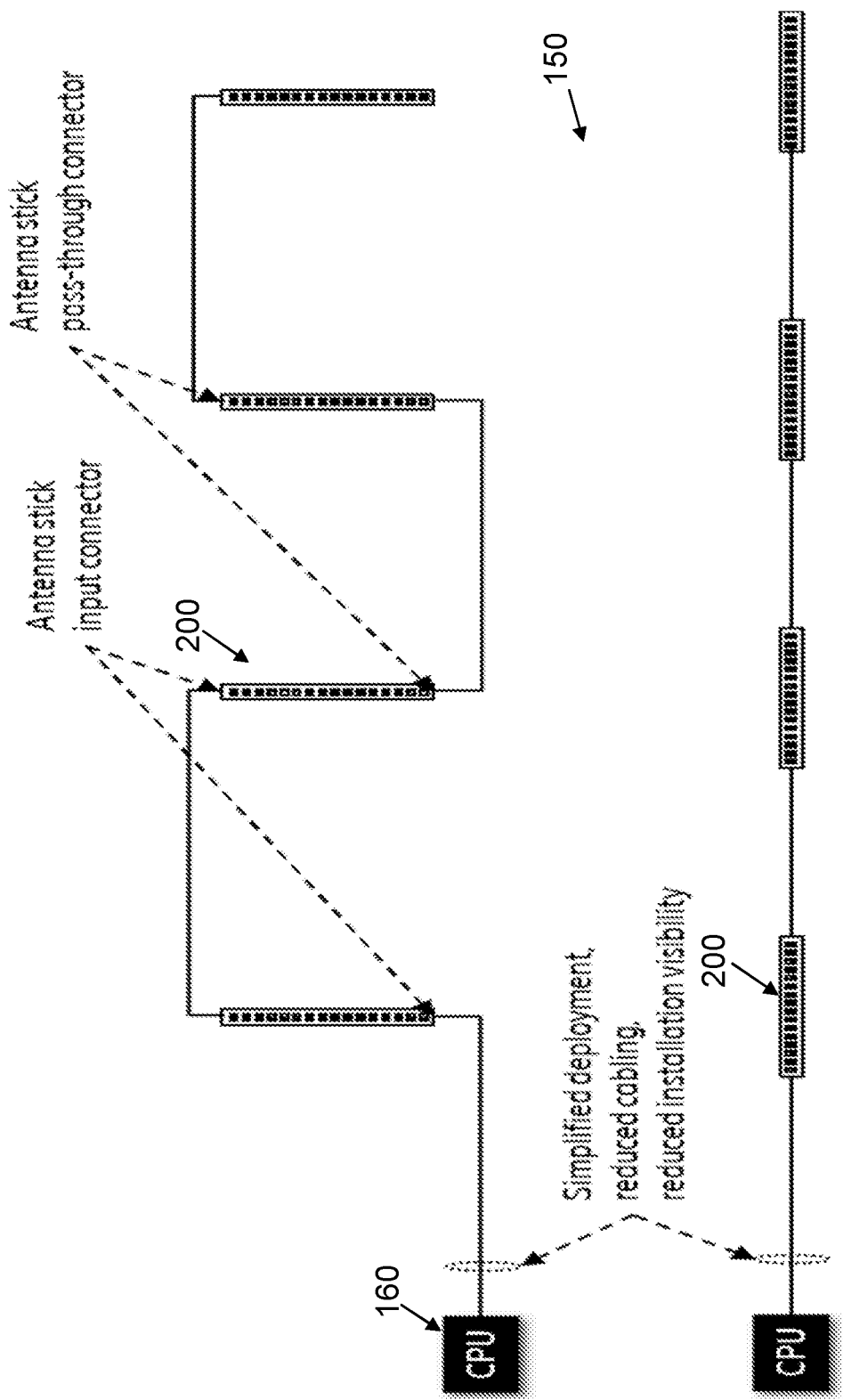
FIG. 9a illustrates an example of a semi-distributed massive MIMO utilizing serial cabling to multiple antenna sticks of an antenna system according to embodiments herein.

In an advantageous embodiment the antenna sticks in the semi-distributed massive MIMO system are connected using serial cabling, see FIG. 9a, depicts a semi-distributed massive MIMO such as the antenna system 150, utilizing serial cabling to multiple antenna sticks antenna. This configuration reduces the deployment complexity, the amount of cabling required to connect the antenna sticks, and it reduces the visibility of the installation.

Figure 9B:
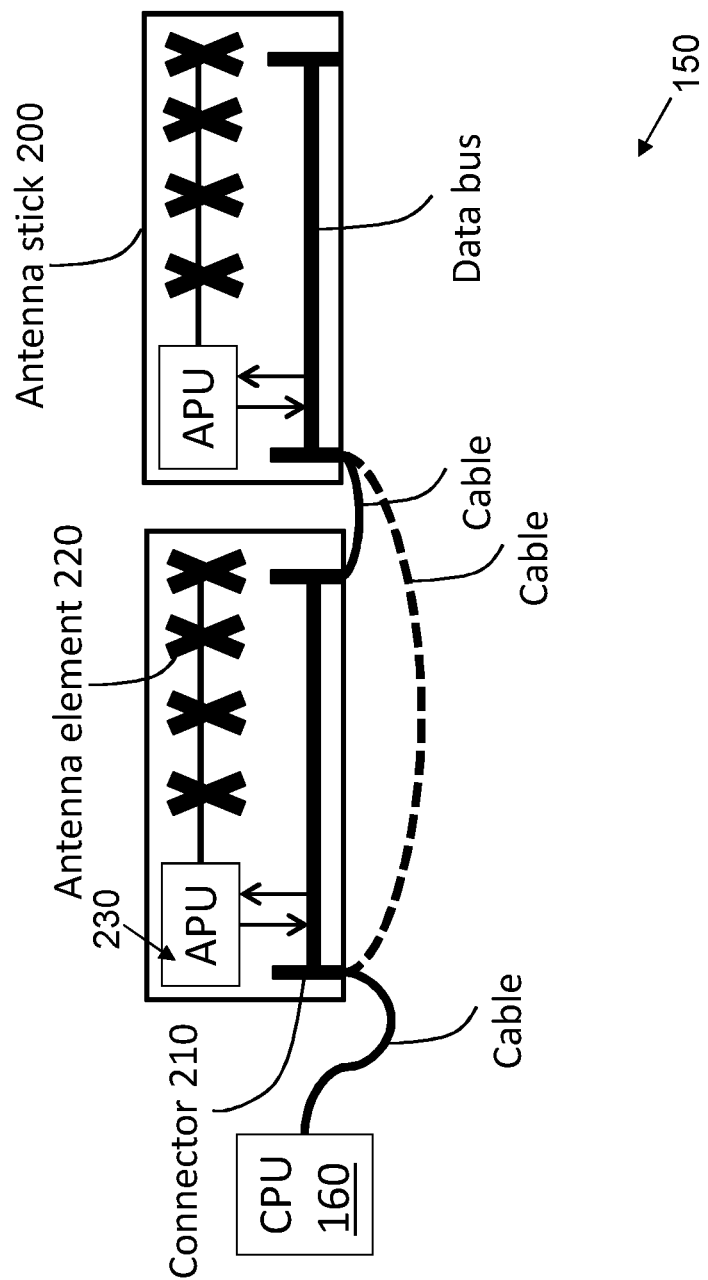
FIG. 9b illustrates an example of an antenna system according to embodiments herein.

FIG. 9b depicts an example of the antenna system 150 according to some embodiments herein, which may be implemented in the semi-distributed massive MIMO system. The antenna system 150 comprises a Centralized Processing Unit (CPU) 160 and at least two antenna units or sticks 200 connected to the CPU 160 by cables. Each antenna unit 200 comprises at least one connector 210, one or more antenna elements 220 and one or more Antenna Processing Units (APUs) 230 connected to the one or more antenna elements 200. The one or more antenna processing units 230 are connected to a data bus connected to the at least one connector 210.

The at least two antenna units may be connected to the CPU by cables in different ways. The cable shown in dotted line is an alternative way.

Figure 10:
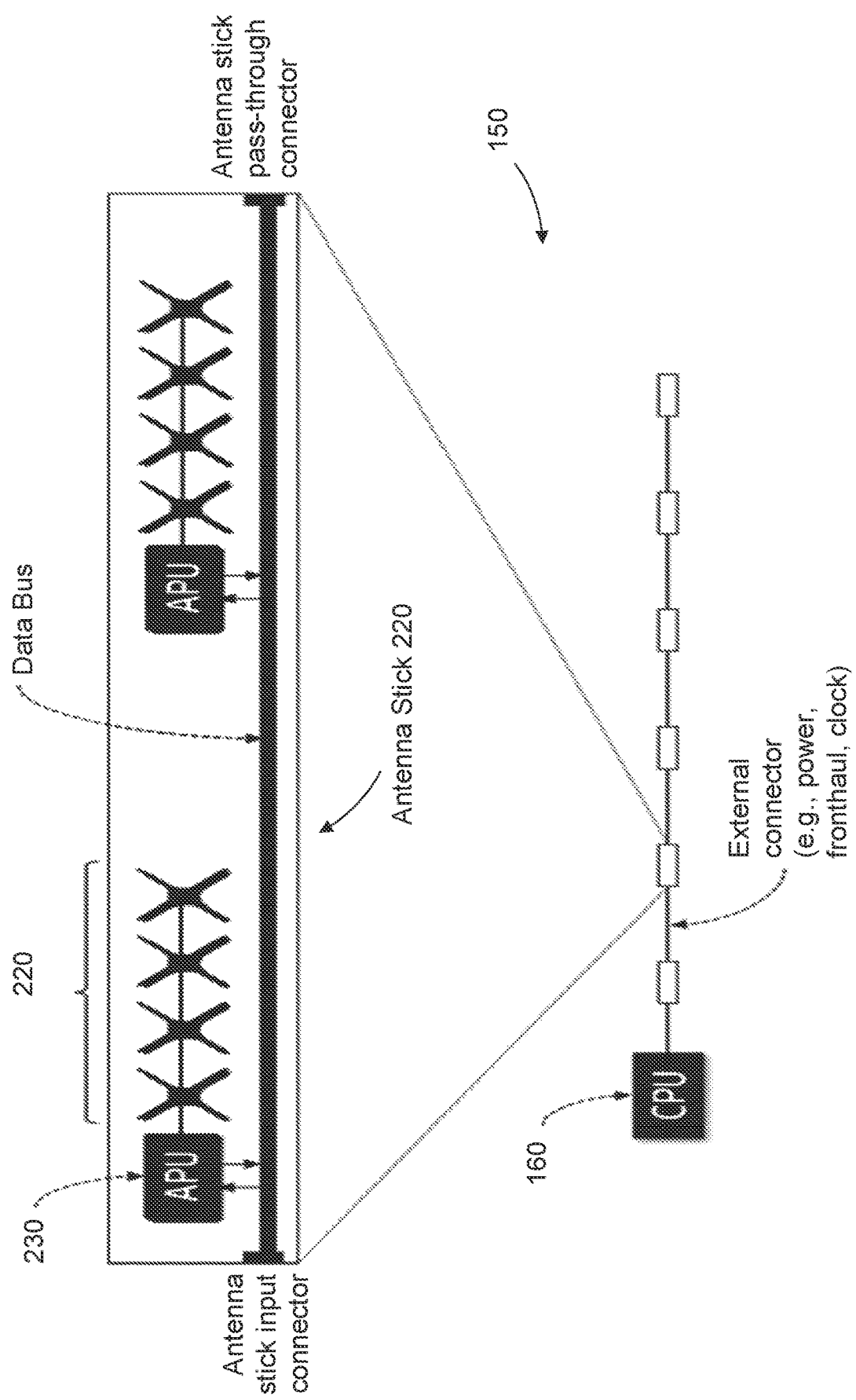
FIG. 10 illustrates an overview of a semi-distributed massive MIMO system comprising a central processing unit and multiple antenna sticks according to embodiments herein.

FIG. 10 shows one example embodiment of a semi-distributed massive MIMO system such as the antenna system 150 comprising a central processing unit 160 and multiple antenna sticks 200 in accordance with embodiments herein.

The system comprises a central processing unit (CPU) 160 responsible for the base band and most of physical layer processing, the backhaul to an external gateway, communication with other CPU units in the network etc. The antenna stick 200 comprises of one or more antenna processing units (APU) 230.

The APU 230 handles the Input/output communication with the CPU and performs the remaining physical layer processing not done by the CPU such as e.g. channel estimation and antenna pre-coder operations. In some embodiments the pre-coder coefficients are computed by the CPU 160 and applied by the APU 230. In some embodiments the APU 230 both compute and applies the pre-coding coefficients. In some embodiments the pre-coder coefficients are frequency selective and, in such embodiments, the APU 230 may perform OFDM operation as well i.e. calculating an inverse fast Fourier transform (IFFT) when transmitting and a normal FFT when receiving. In other embodiments OFDM operations are performed in the CPU 160.

Internally the one or more APU 230 in the antenna stick 200 may be connected through a serial data bus providing e.g. front haul communication, power-supply, and clock signals.

Each antenna stick 200 contains two or more antenna elements 220 and each APU 230 in the antenna stick 200 are connected to one or more of these antenna elements.

Multiple antenna sticks are in a preferred embodiment connected serially as seen in the lower part of FIG. 10. To facilitate this, the antenna stick may be equipped with both an input connector as well as a pass-through connector.

Note that in FIG. 10 there is only one single input connector and one single pass-through connector depicted that provides both power-supply, clock signals, and front haul signals. In some embodiments these functions may use different physical connectors.

Figure 11:
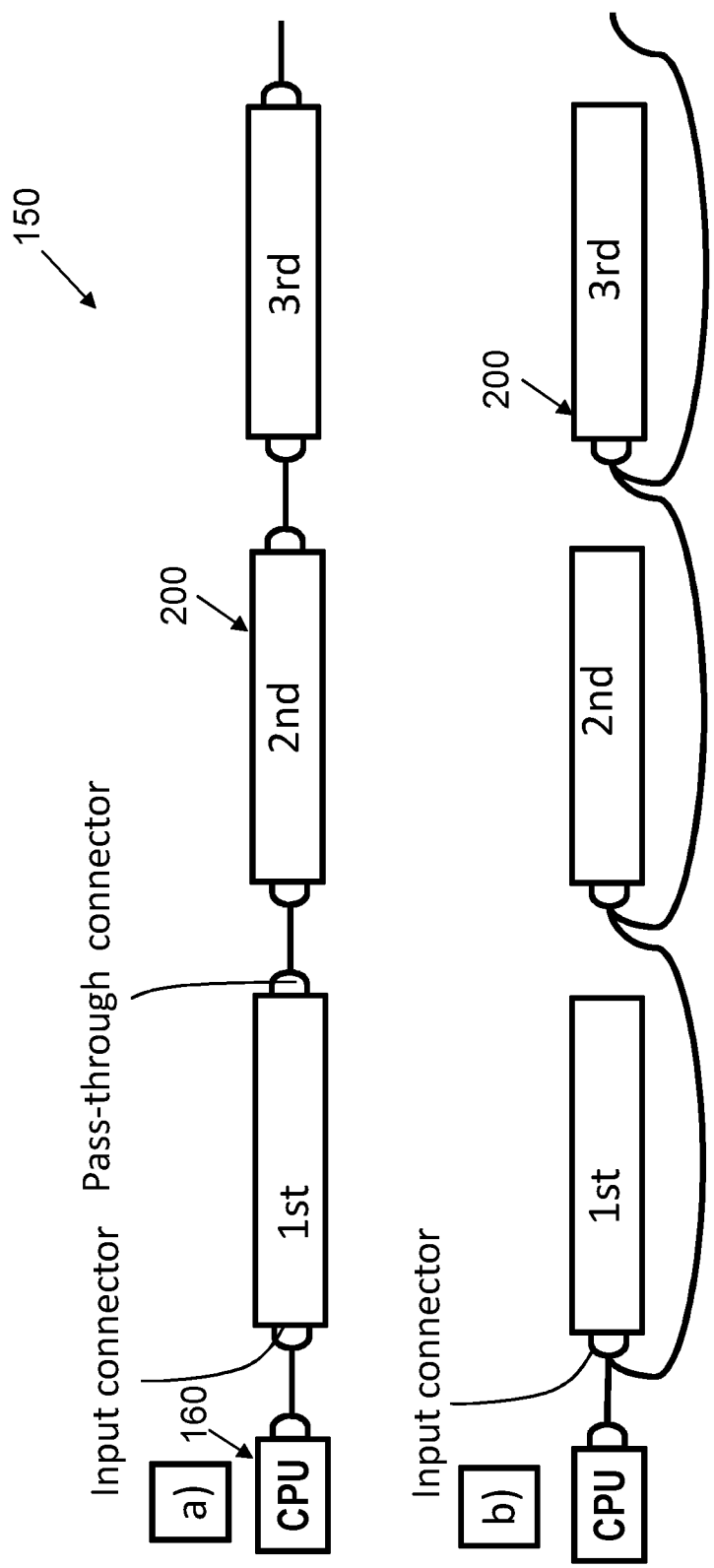
FIG. 11 illustrate two examples of an antenna system according to embodiments herein.

FIG. 11a, b show two examples of the antenna system 150 of connecting at least two antenna units to the CPU by cables.

In FIG. 11a), each antenna unit 200 comprises an input connector and a pass-through connector, the at least two antenna units are connected in serial to the CPU 160 by serial cabling such that the input connector of the first antenna unit is connected to the CPU with a first cable, the pass-through connector of the first antenna unit is connected to the input connector of the second antenna unit with a second cable.

In FIG. 11b), each antenna unit 200 comprises one input connector, the at least two antenna units are connected in serial to the CPU by serial cabling such that the input connector of the first antenna unit is connected to the CPU with a first cable, the input connector of the second antenna unit is connected to the input connector of the first antenna unit with a second cable.

Figure 12:
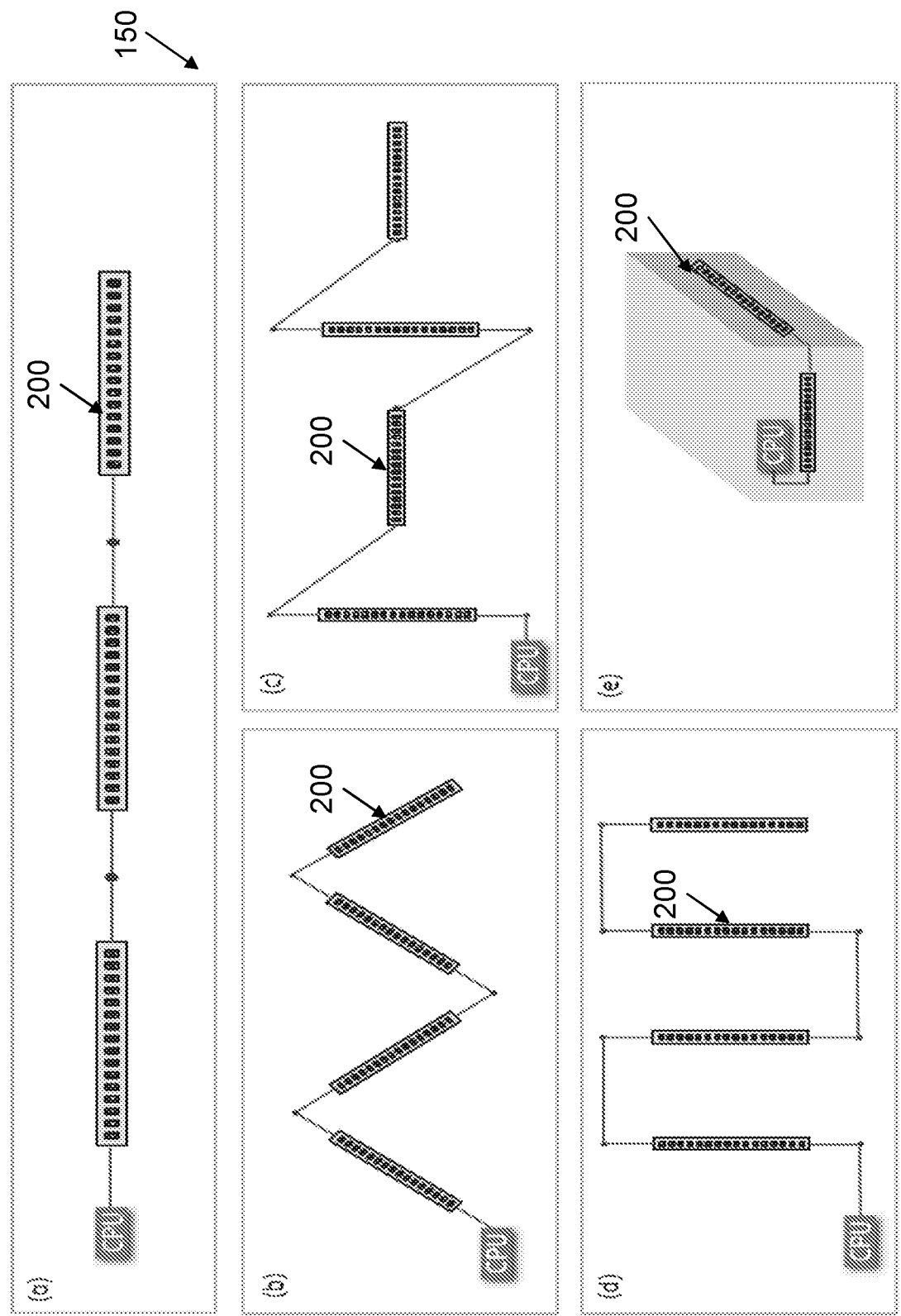
FIG. 12 illustrates deployment examples of semi-distributed massive MIMO comprising of two or more serially connected antenna sticks according to embodiments herein.

Deployment examples of semi-distributed massive MIMO such as the antenna system 150, comprising two or more serially connected antenna units according with the disclosure are shown in FIG. 12. In FIG. 12(a) there is shown a linear configuration e.g. suitable for deployment in a ceiling of a factory, or horizontally or vertically on an outdoor building, etc. In (b) and (c) there are shown antenna configurations designed to enable both horizontal and vertical spatial resolution of the radio channel. In (d) there is shown a configuration that may be suitable for mounting on walls and in (e) a configuration is depicted of a semi-distributed massive MIMO system reaching around a corner of e.g. a building.

The flexibility of how the antenna system 150 such as a semi-distributed massive MIMO system may be deployed is practically limitless. Note that also configurations with parallel cabling are possible (not shown in FIG. 12).

Figure 13:
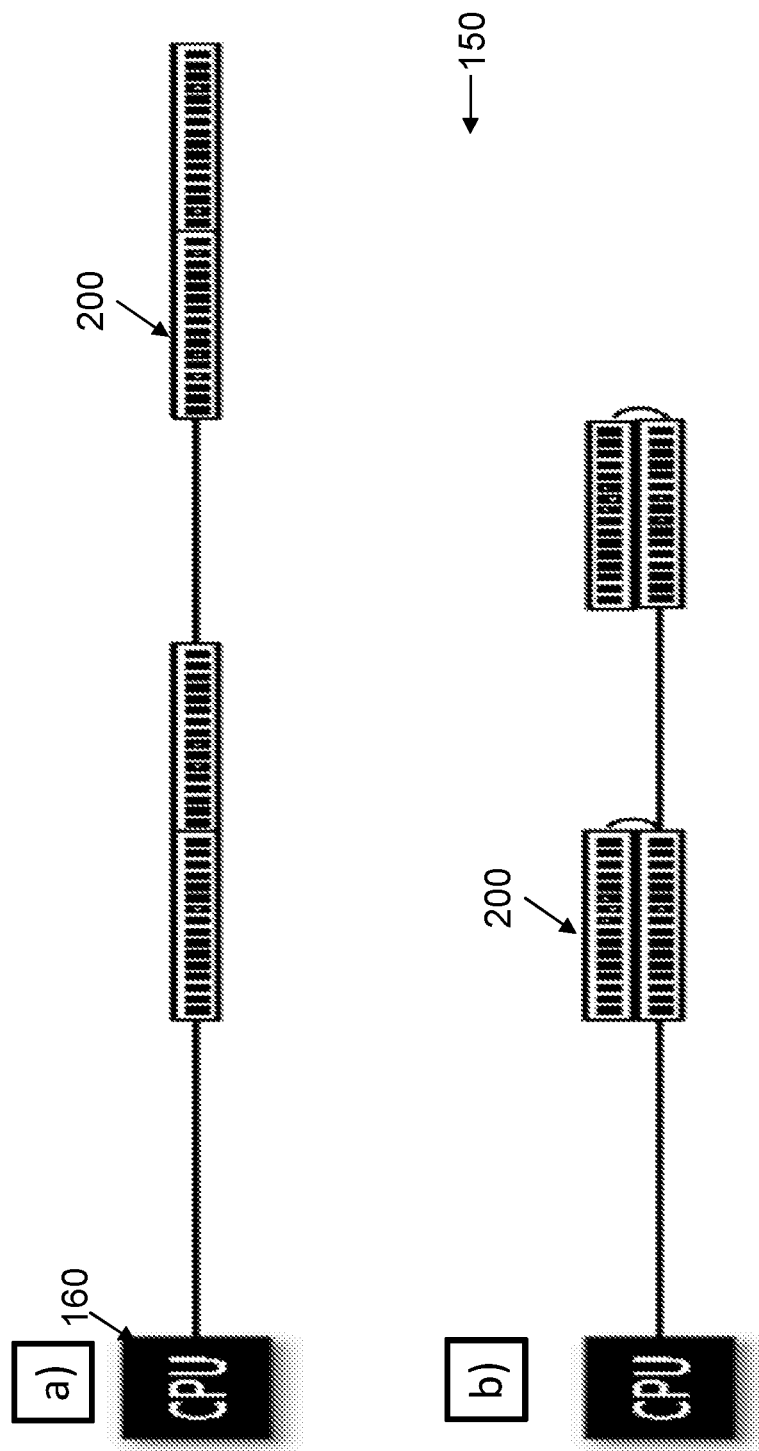
FIG. 13 illustrates example embodiments of an antenna system according to embodiments herein.

The antenna units 200 may be installed end-to-end and deployed partly co-located. FIG. 13 depicts example embodiments of the antenna system 150 with antenna sticks/units 200 in a semi-distributed massive MIMO system in which some antenna units are co-located, and some are not. This enables even more flexibility since it allows antenna units to be modular and with only a small number of antenna elements variants, e.g. comprising of 1 APU and 4 antenna elements. Many variant deployments are enabled e.g. distributing antenna elements in a semi-distributed massive MIMO system in co-located multiples of 4, e.g. 4, 8, 12, 16, etc.

Note that in FIG. 13b) some antenna units 200 may need two pass-through connectors or one pass-through connector may be connected to two antenna units. In general, there may be more than two pass-through connectors on an antenna unit or a pass-through connector may be connected to more than two antenna units.

Figure 14:
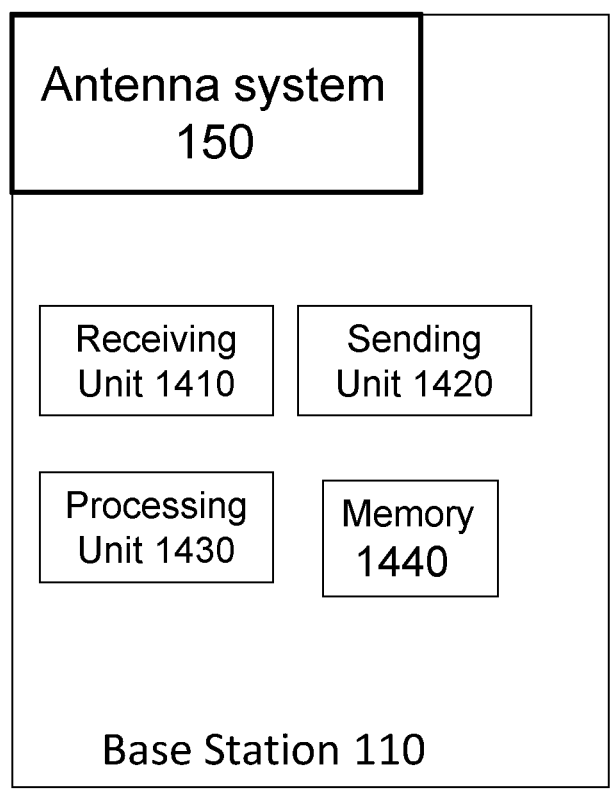
FIG. 14 illustrates an example of a base station comprising an antenna system according to embodiments herein.

FIG. 14 shows an example of the base station 110 comprising the antenna system 150 and comprising a receiving unit 1410, a sending unit 1420, a processing unit 1430 and an antenna system 150 according to embodiments herein.

The base station 110 may further comprise memory 1440 comprising one or more memory units. The memory 1440 comprises instructions executable by the processing unit 1430 in the base station 110.

Some example Embodiments numbered 1-11 are described below. The following embodiments refer to FIGS. 8-14.

Embodiment 1: An antenna system 150. The antenna system 150 comprises a Centralized Processing Unit, CPU, 160; at least two antenna units or sticks 200 connected to the CPU 160 by cables. Each antenna unit 200 comprises at least one connector 210; one or more antenna elements 220; one or more Antenna Processing Units (APUs) 230 connected to the one or more antenna elements 220. The one or more antenna processing units 230 are connected to a data bus connected to the at least one connector 210.

Embodiment 2: Each antenna unit 200 in the antenna system 150 may comprise an input connector and a pass-through connector. The at least two antenna units are connected in serial to the CPU by serial cabling such that the input connector of the first antenna unit is connected to the CPU with a first cable, the pass-through connector of the first antenna unit is connected to the input connector of the second antenna unit with a second cable.

Embodiment 3: Each antenna unit 200 in the antenna system 150 may comprise one input connector. The at least two antenna units are connected in serial to the CPU by serial cabling such that the input connector of the first antenna unit is connected to the CPU with a first cable, the input connector of the second antenna unit is connected to the input connector of the first antenna unit with a second cable.

Embodiment 4: The at least two antenna units may be configured to cooperate in phase coherency for beamforming of user data to and from a user device.

Embodiment 5: The APUs may be configured to handle input and output communications with the CPU and perform some physical layer processing.

Embodiment 6: Each antenna unit 200 may be provided with an identical base-band signal and each APU 230 of the antenna unit 200 is configured to perform and apply precoding-based beamforming to its antenna elements independently.

Embodiment 7: The CPU 160 may be configured to compute pre-coder coefficients and the APU 230 may be configured to apply the pre-coder coefficients to the antenna elements 220 for beamforming.

Embodiment 8: The APUs 230 may be configured to compute and apply the pre-coding coefficients to the antenna elements 220 for beamforming.

Embodiment 9: The APUs 230 may be configured to perform orthogonal frequency-division multiplexing (OFDM) encoding.

Embodiment 10: A base station 110 comprising the antenna system 150 according to the embodiments herein.

Embodiment 11: A semi-distributed massive Multiple-Input Multiple-Output (MIMO) communication system comprises a plurality of base stations, each base station 110 comprises an antenna system 150 according to the embodiments herein.

The invention claimed is:

1. An antenna system comprising:
a Centralized Processing Unit (CPU); and
at least two antenna units connected to the CPU by cables, wherein each antenna unit comprises:
at least one connector;
one or more antenna elements;
one or more Antenna Processing Units (APUs) connected to the one or more antenna elements, wherein the one or more APUs are connected to a data bus connected to the at least one connector; and
the at least two antenna units being configured to cooperate in phase coherency for beamforming of user data to and from a user device.

2. The antenna system according to claim 1, wherein each antenna unit comprises an input connector and a pass-through connector, wherein the at least two antenna units are connected in serial to the CPU by serial cabling such that the input connector of a first antenna unit is connected to the CPU with a first cable and the pass-through connector of the first antenna unit is connected to the input connector of a second antenna unit with a second cable.

3. The antenna system according to claim 1, wherein each antenna unit comprises one input connector, wherein the at least two antenna units are connected in serial to the CPU by serial cabling such that the input connector of a first antenna unit is connected to the CPU with a first cable and the input connector of a second antenna unit is connected to the input connector of the first antenna unit with a second cable.

4. The antenna system according to claim 1, wherein the APUs are configured to handle input and output communications with the CPU and perform physical layer processing.

5. The antenna system according to claim 1, wherein each antenna unit is provided with an identical base-band signal and each APU of each antenna unit is configured to perform and apply pre-coding-based beamforming to its antenna elements independently.

6. The antenna system according to claim 5, wherein the CPU is configured to compute pre-coder coefficients and each APU of each antenna unit is configured to apply the pre-coder coefficients to the antenna elements for beamforming.

7. The antenna system according to claim 5, wherein the APUs are configured to compute and apply the pre-coding coefficients to the antenna elements for beamforming.

8. The antenna system according to claim 4, wherein the APUs are configured to perform orthogonal frequency-division multiplexing (OFDM) encoding.

9. A base station comprising:
an antenna system, wherein the antenna system comprises:
a Centralized Processing Unit (CPU); and
at least two antenna units connected to the CPU by cables, wherein each antenna unit comprises:
at least one connector;
one or more antenna elements;
one or more Antenna Processing Units (APUs) connected to the one or more antenna elements, wherein the one or more APUs are connected to a data bus connected to the at least one connector; and
the at least two antenna units being configured to cooperate in phase coherency for beamforming of user data to and from a user device.

10. The base station according to claim 9, wherein each antenna unit comprises an input connector and a pass-through connector, wherein the at least two antenna units are connected in serial to the CPU by serial cabling such that the input connector of a first antenna unit is connected to the CPU with a first cable and the pass-through connector of the first antenna unit is connected to the input connector of a second antenna unit with a second cable.

11. The base station according to claim 9, wherein each antenna unit comprises one input connector, wherein the at least two antenna units are connected in serial to the CPU by serial cabling such that the input connector of a first antenna unit is connected to the CPU with a first cable and the input connector of a second antenna unit is connected to the input connector of the first antenna unit with a second cable.

12. The base station according to claim 9, wherein the APUs are configured to handle input and output communications with the CPU and perform physical layer processing.

13. The base station according to claim 9, wherein each antenna unit is provided with an identical base-band signal and each APU of each antenna unit is configured to perform and apply pre-coding-based beamforming to its antenna elements independently.

14. The base station according to claim 13, wherein the CPU is configured to compute pre-coder coefficients and each APU of each antenna unit is configured to apply the pre-coder coefficients to the antenna elements for beamforming.

15. The base station according to claim 13, wherein the APUs are configured to compute and apply the pre-coding coefficients to the antenna elements for beamforming.

16. The base station according to claim 12, wherein the APUs are configured to perform orthogonal frequency-division multiplexing (OFDM) encoding.

17. A wireless communications network comprising a plurality of base stations, wherein, for each base station, the base station comprises an antenna system, the antenna system comprising:
a Centralized Processing Unit (CPU); and
at least two antenna units connected to the CPU by cables, wherein each antenna unit comprises:
at least one connector;
one or more antenna elements;
one or more Antenna Processing Units (APUs) connected to the one or more antenna elements, wherein the one or more APUs are connected to a data bus connected to the at least one connector; and
the at least two antenna units being configured to cooperate in phase coherency for beamforming of user data to and from a user device.

* * * * *